(12) United States Patent
Walters et al.

(10) Patent No.: US 10,861,008 B2
(45) Date of Patent: Dec. 8, 2020

(54) SYSTEM AND METHOD FOR OPTIMIZING CRYPTOCURRENCY TRANSACTIONS

(71) Applicant: Capital One Services, LLC, McLean, VA (US)

(72) Inventors: Austin Grant Walters, McLean, VA (US); Jeremy Edward Goodsitt, McLean, VA (US); Fardin Abdi Taghi Abad, Champaign, IL (US); Anh Truong, McLean, VA (US); Vincent Pham, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/230,437

(22) Filed: Dec. 21, 2018

(65) Prior Publication Data

US 2020/0202336 A1 Jun. 25, 2020

(51) Int. Cl.
*G06Q 20/36* (2012.01)
*G06Q 20/40* (2012.01)

(52) U.S. Cl.
CPC ....... *G06Q 20/3678* (2013.01); *G06Q 20/401* (2013.01); *G06Q 2220/00* (2013.01)

(58) Field of Classification Search
None
See application file for complete search history.

(56) References Cited

U.S. PATENT DOCUMENTS

| | | |
|---|---|---|
| 5,535,407 A | 7/1996 | Yanagawa |
| 5,953,709 A | 9/1999 | Gilbert |
| 8,060,598 B1 | 11/2011 | Cook et al. |
| 8,266,066 B1 | 9/2012 | Wezter et al. |
| 9,741,036 B1 | 8/2017 | Grassadonia et al. |
| 10,055,715 B1 | 8/2018 | Grassadonia et al. |
| 2001/0025262 A1 | 9/2001 | Ahmed |
| 2002/0179401 A1* | 12/2002 | Knox .............. G06Q 20/28 194/217 |

(Continued)

OTHER PUBLICATIONS

Hamacher, "Mining's dirty little secret", Nov. 26, 2018, Depcrypt Media, pp. 1-8 (Year: 2018).*

(Continued)

*Primary Examiner* — Jay Huang
*Assistant Examiner* — Gabriel Mercado (57) ABSTRACT

In the disclosed transaction processing system, a system and method are described that increase the ease of access and use of different currency networks by consumers using customizable transaction devices. The customizable transaction devices may be re-programmed prior to or during a currency transaction in accordance with the consensus protocol of the currency network associated with the currency transaction. The currency network further includes one or more host devices, each of which include an interface configured to communicate with a transaction device for the purposes of re-programming a Field Programmable Gate Array (FPGA) of the transaction device according to one or more currency network consensus protocols. Optimizing the performance of transaction devices for proof-of-work or other consensus protocol processing decreases the latency associated with validating currency network transactions, thereby increasing the suitability of cryptocurrency for retail transactions.

20 Claims, 7 Drawing Sheets

(56) References Cited

U.S. PATENT DOCUMENTS

| | | |
|---|---|---|
| 2004/0083149 A1 | 4/2004 | Jones |
| 2004/0122699 A1 | 6/2004 | Brito |
| 2005/0154751 A1 | 7/2005 | Levi et al. |
| 2005/0269402 A1* | 12/2005 | Spitzer ............... G06Q 20/04 235/380 |
| 2006/0131392 A1 | 6/2006 | Cooper |
| 2008/0126610 A1* | 5/2008 | He .................. H04L 7/0008 710/30 |
| 2008/0228647 A1 | 9/2008 | Kachel et al. |
| 2008/0249848 A1 | 10/2008 | Kay et al. |
| 2008/0249926 A1 | 10/2008 | Sgaraglio |
| 2009/0172035 A1 | 7/2009 | Lessing |
| 2009/0293104 A1 | 11/2009 | Levi et al. |
| 2009/0299909 A1 | 12/2009 | Levi et al. |
| 2010/0061250 A1* | 3/2010 | Nugent ............ H04L 41/5045 370/242 |
| 2010/0100483 A1* | 4/2010 | Lin .................. G06Q 20/10 705/44 |
| 2014/0058667 A1* | 2/2014 | Schuh ................ G01S 17/42 701/514 |
| 2014/0188643 A1* | 7/2014 | Murphy ............ G06Q 20/202 705/21 |
| 2014/0222632 A1 | 8/2014 | Dhakephalkar et al. |
| 2014/0310172 A1 | 10/2014 | Grossman et al. |
| 2015/0356524 A1* | 12/2015 | Pennanen ........... G06Q 20/065 705/71 |
| 2015/0371224 A1 | 12/2015 | Lingappa |
| 2016/0260169 A1 | 9/2016 | Arnold et al. |
| 2016/0267605 A1 | 9/2016 | Lingham et al. |
| 2016/0335628 A1 | 11/2016 | Weigold |
| 2016/0342976 A1 | 11/2016 | Davis |
| 2016/0342978 A1 | 11/2016 | Davis et al. |
| 2016/0342989 A1 | 11/2016 | Davis |
| 2016/0342994 A1 | 11/2016 | Davis |
| 2017/0046806 A1 | 2/2017 | Haldenby et al. |
| 2017/0161734 A1 | 6/2017 | Bankston et al. |
| 2017/0213209 A1 | 7/2017 | Dillenberger |
| 2017/0230189 A1 | 8/2017 | Toll et al. |
| 2017/0235970 A1 | 8/2017 | Conner |
| 2017/0236121 A1 | 8/2017 | Lyons et al. |
| 2017/0243212 A1 | 8/2017 | Castinado et al. |
| 2017/0243214 A1 | 8/2017 | Johnsrud et al. |
| 2017/0243217 A1 | 8/2017 | Johnsrud et al. |
| 2017/0243222 A1 | 8/2017 | Balasubramanian |
| 2017/0243286 A1 | 8/2017 | Castinado et al. |
| 2017/0243287 A1 | 8/2017 | Johnsrud et al. |
| 2017/0270482 A1 | 9/2017 | Mohun |
| 2017/0344983 A1 | 11/2017 | Muftic |
| 2017/0357970 A1 | 12/2017 | Muftic |
| 2017/0372417 A1 | 12/2017 | Gaddam et al. |
| 2018/0005203 A1 | 1/2018 | Grassadonia et al. |
| 2018/0005229 A1 | 1/2018 | Grassadonia |
| 2018/0025442 A1 | 1/2018 | Isaacson et al. |
| 2018/0039667 A1 | 2/2018 | Pierce et al. |
| 2018/0046992 A1 | 2/2018 | Hanrahan et al. |
| 2018/0054491 A1 | 2/2018 | Mankovskii et al. |
| 2018/0063099 A1 | 3/2018 | Versteeg et al. |
| 2018/0068130 A1 | 3/2018 | Chan et al. |
| 2018/0075453 A1 | 3/2018 | Durvasula et al. |
| 2018/0082359 A1 | 3/2018 | Hilmola |
| 2018/0083786 A1 | 3/2018 | Dierks et al. |
| 2018/0089641 A1 | 3/2018 | Chan et al. |
| 2018/0091524 A1 | 3/2018 | Setty et al. |
| 2018/0101914 A1 | 4/2018 | Samuel et al. |
| 2018/0121911 A1 | 5/2018 | Hallam et al. |
| 2018/0150488 A1 | 5/2018 | Runchey |
| 2018/0150865 A1 | 5/2018 | Arora |
| 2018/0158051 A1 | 6/2018 | Arora |
| 2018/0158139 A1 | 6/2018 | Krajicek et al. |
| 2018/0181954 A1* | 6/2018 | Sinton ............... G06Q 20/22 |
| 2018/0189781 A1 | 7/2018 | McCann et al. |
| 2018/0197173 A1 | 7/2018 | Durvasula et al. |
| 2018/0225640 A1 | 8/2018 | Chapman et al. |
| 2018/0225660 A1 | 8/2018 | Chapman et al. |
| 2018/0254887 A1 | 9/2018 | Ateniese et al. |
| 2018/0268401 A1 | 9/2018 | Ortiz et al. |
| 2018/0276666 A1 | 9/2018 | Haldenby et al. |
| 2018/0276710 A1 | 9/2018 | Tietzen et al. |
| 2018/0285839 A1 | 10/2018 | Yang et al. |
| 2018/0293553 A1 | 10/2018 | Dembo et al. |
| 2018/0308117 A1 | 10/2018 | Gupta |
| 2018/0315027 A1 | 11/2018 | Kumar |
| 2018/0329693 A1* | 11/2018 | Eksten ............... G06F 16/21 |
| 2019/0005469 A1 | 1/2019 | Dhupkar et al. |
| 2019/0005491 A1 | 1/2019 | Grassadonia et al. |
| 2019/0012695 A1 | 1/2019 | Bishnoi et al. |
| 2019/0020468 A1 | 1/2019 | Rosenoer |
| 2019/0028276 A1 | 1/2019 | Pierce et al. |
| 2019/0034465 A1* | 1/2019 | Shimamura ......... G06F 16/2474 |
| 2019/0034888 A1 | 1/2019 | Grassadonia et al. |
| 2019/0034903 A1 | 1/2019 | Arora |
| 2019/0037401 A1* | 1/2019 | Egner ................ H04W 12/08 |
| 2019/0068562 A1 | 2/2019 | Iyer et al. |
| 2019/0073666 A1 | 3/2019 | Ortiz et al. |
| 2019/0080406 A1 | 3/2019 | Molinari et al. |
| 2019/0081789 A1 | 3/2019 | Madisetti et al. |
| 2019/0238550 A1 | 8/2019 | Zhang et al. |
| 2019/0251187 A1 | 8/2019 | Lin |
| 2019/0268141 A1* | 8/2019 | Pandurangan ....... H04L 9/3239 |
| 2019/0361874 A1 | 11/2019 | Fukuchi et al. |

OTHER PUBLICATIONS

Bitcoin.org, WayBackMachine capture of Dec. 16, 2018, https://bitcoin.org/en/full-node (Year: 2018).*

Gao, F., et al., "A Blockchain-Based Privacy-Preserving Payment Mechanism for Vehicle-to-Grid Networks," in IEEE Network, 32(6):184-192 (2018).

Battista, G.D., et al., "Bitconeview: visualization of flows in the bitcoin transaction graph," 2015 IEEE Symposium on Visualization for Cyber Security (VizSec), Chicago, IL, pp. 1-8 (2015).

Hu et al., "A Robust Retail POS System Based on Blockchain and Edge Computing", Springer Nature, pp. 99-110, Jun. 2018.

* cited by examiner

SYSTEM AND METHOD FOR OPTIMIZING CRYPTOCURRENCY TRANSACTIONS

BACKGROUND

Cryptocurrency is an encrypted, decentralized digital currency transferred between members of a cryptocurrency network. Information about the status of each account, including a list of transactions undertaken with the account, are maintained within a distributed public ledger. A copy of the distributed public ledger is maintained by each member of the currency network. The distributed nature of the cryptocurrency ledger makes it necessary for the cryptocurrency network to impose strong controls over leger modification. These controls, also referred to as 'consensus protocols' include authentication mechanisms (such as private and public key mechanisms) to authenticate the origin and destination of a transfer transaction and validation mechanisms to control the addition of transactions to the ledger.

A cryptocurrency exchange may proceed as follows. When a member 'A' desires to exchange currency with another member 'B', member A broadcasts a transaction message to all other members of the currency network, where the transaction message includes information about the transaction and its effect on the public ledger.

In many cryptocurrencies, the ledgers do not record a value of an account, but rather comprise a collection of linked transactions relating to the ownership of the currency, also referred to as a 'transaction chain'. For example, to prove that member A has sufficient funds to make a transfer to member B, the requested transfer includes links to previous input ("funding") transactions to prove that A has received sufficient funds to cover the transaction. Once an input transaction has been used, it is marked as 'spent' in the ledger and cannot be used again.

Member A broadcasts the transaction with member B to all members of the currency network. Each recipient member must authenticate the source, and validate the transaction, for example by searching their list of transactions to ensure that Member A is not trying to use inputs that have already been spent in other transactions.

Because the cryptocurrency network is distributed, transactions may arrive at different members of the cryptocurrency network in different order. This poses a potential for currency network misuse where, for example, member A issues multiple transactions using the same input funding before the shared ledger can be updated to reflect its use.

To reduce the opportunity for such fraudulent behavior, currency networks use block chain technology to impart an order to a transaction chain. Transactions which are received at relatively the same time by a member are validated, grouped together in blocks, and issued over the network in the form of a blockchain update. Each blockchain update includes a link to the previous block in the block chain. As part of the consensus protocol followed by each member, to validate a block a member authenticates sender and recipient, determines whether transaction inputs have been previously used, and may perform some other task or satisfy some other threshold dictated by the consensus protocol. In many currency networks, the 'other task' of the consensus protocol is selected to control the speed at which blocks are validated to allow propagation of the transactions through the network and reduce the potential for currency network misuse.

Many cryptocurrencies use a 'proof-of-work' consensus protocol to serve this purpose. In a proof-of-work consensus protocol, members with potential blockchain updates compete against each other to solve extremely difficult and complex cryptographic puzzles. The first member to solve the puzzle 'wins' and their proposed blockchain update is appended to the blockchain. In some cryptocurrencies, the 'winner' is also rewarded with payment. Bitcoin members, for example, who 'win' in block validation attempts are rewarded with bitcoins, and are often referred to as 'miners', with the proof-of-work activity performed by the miners is referred to as 'mining'.

One obstacle to the wide acceptance of cryptocurrency in daily commerce results from the delays associated with validating transaction chains and calculating the proof-of-work of the consensus protocol. The 'hashcash' algorithm used by the Bitcoin consensus protocol requires a significant expenditure of processing power to generate blocks for transmission and is designed to limit email spam and denial of service attacks. The hashcash algorithm can be time consuming, and would may take some single computer years to solve. But when all members of the Bitcoin network cooperate to 'mine' a block the average time for the entire network to converge on a valid solution to the puzzle is in the range of ten minutes. Some members of cryptocurrency networks attempt to reduce the time needed to mine a block by joining together to pool their resources, but for cryptocurrency networks such as Bitcoin, the hashcash algorithm adjusts after every 2016 blocks to get easier or harder based on how long it took for those 2016 blocks to be mined. It would be desirable to identify a system that reduces the processing time of consensus protocols to enable cryptocurrency to be more easily utilized in daily commerce.

SUMMARY

According to one aspect of the invention, a method for processing transactions received at a host device from a transaction device that is a member of a payment network that uses a distributed ledger to manage currency includes the steps of receiving a currency type from a transaction device, determining whether the transaction device is configured to support transactions of the currency type, responsive to the step of determining, selectively re-programming the transaction device in accordance with the currency type and indicating to the transaction device that re-programming of the transaction device is completed. With such an arrangement, the underlying hardware of transaction devices may be configured to reduce proof-of-work processing time by transaction devices in their preferred currency network.

A host device includes a port adapted to receive a currency transaction from a transaction device, a memory device having instructions stored thereon for programming a Field Programmable Gate Array (FPGA) of the transaction device in accordance with one or more of a plurality of protocols associated with a corresponding plurality of currency networks, a processor including re-programming logic and a blockchain controller, the re-programming logic for selectively re-programming the transaction device in accordance with a protocol of the currency transaction and a plurality of blockchains, stored on the memory device, the plurality of blockchains associated with a plurality of host-member currency networks. With such an arrangement, host devices may be used to customize transaction devices for use with preferred cryptocurrency networks.

According to a further aspect, a method for processing transactions received at a host device from transaction devices that are members of payment networks that use distributed ledgers to manage currency transactions includes the step of receiving a first currency transaction from a first transaction device, the first currency transaction including a first distributed ledger entry including a first currency type, first account value information and a first transaction value. The method further includes the step of receiving a second currency transaction from a second transaction device, the second currency transaction including a second distributed ledger entry including a second currency type, second account value information and a second transaction value. The method includes the steps of determining whether the first transaction device is configured to support transactions of the first currency type and determining whether the second transaction device is configured to support transactions of the second currency type different from the first currency type. The method also includes the steps of responsive to the steps of determining whether the first device is configured to support transaction of the first currency type, selectively re-programming the first transaction device and responsive to the steps of determining whether the second device is configured to support transactions of the second currency type, selectively re-programming the second transaction device at least partially in parallel with selectively re-programming the first transaction device. The method further includes the steps of selectively validating the first transaction if the first distributed ledger entry corresponds to a stored copy of the first distributed ledger entry and selectively validating the second transaction if the second distributed ledger entry corresponds to a stored copy of the second distributed ledger entry. With such an arrangement, a host device may be used to selectively reprogram different currency transaction devices in accordance with the preferred currency network of each respective transaction devices to reduce the overall time required to perform transactions using cryptocurrency networks.

According to another aspect, a method for processing transactions by a transaction device that is a member of a payment network that uses a distributed ledger to manage currency includes the steps of forwarding a selected currency type for the payment network to a coupled host device and forwarding a current protocol indicator to the host device, the current protocol indicator identifying a currency protocol type for which the transaction device is configured. The method includes the steps of receiving reprogramming from the host device if a protocol of the selected currency type differs from the current protocol indicator. The method may further include the step of forwarding a currency transaction to the host device, the currency transaction including the selected currency type and a blockchain update request including an account value comprising a value of an account supporting the currency transaction and a transaction value identifying a value of the transaction.

In some aspects, the step of processing the currency transaction includes the step of determining a transaction fee to process the currency transaction using the payment network according to one of the protocol of the payment network and a transaction processing time. In some embodiments the currency protocol type for which the transaction device is configured comprises a programming code of a Field Programmable Gate Array (FPGA) of the transaction device. The currency protocol type for which the transaction device is configured may be associated with a currency programming code stored in the transaction device.

In some embodiments the currency transaction includes a blockchain update request including an account value identifying an account to be used to support the currency transaction and a transaction value identifying a value of the transaction. In some embodiments, processing power of the transaction device may be used to satisfy the transaction fee. The method may include receiving an authorization of the currency transaction from the host device and updating a distributed ledger entry associated with the transaction to reflect the transaction. The method may include interrogating other payment networks of which the transaction device is a member to identify a payment network with the lowest transaction fee. The method may include the step of displaying transaction fees for each of the payment networks of which the transaction device is a member and/or automatically selecting a payment network having the lowest transaction fee. The method may include the step of automatically selecting a payment network having a payment protocol that corresponds to the currency protocol type for which a Field Programmable Gate Array (FPGA) of the transaction device is configured.

According to another aspect, a transaction device may include an interface configured to exchange currency transactions with a host device and a memory device having a plurality of distributed ledgers stored thereon, each of the distributed ledgers associated with a different currency account of the transaction device and comprising a blockchain for each different currency account. In one embodiment, at least a first currency account of the transaction device may use a first currency network protocol that differs from a second currency network protocol of a second currency account of the transaction device. The transaction device may include at least one Field Programmable Gate Array (FPGA) programmed in accordance with the first currency network protocol and a processor including reprogramming logic for selectively reprogramming the at least one FPGA in accordance with the second currency network protocol to perform a currency transaction using the second currency account of the transaction device.

The transaction device may be configured to determine a transaction fee for the currency transaction according to one of the second currency network protocol and transaction device processing time. The transaction device may further include a cache for storing programming code for at least one FPGA of the transaction device. In some embodiments, the transaction device may include at least two FPGAs, each configured to process different currency protocols. In some embodiments, the transaction device may use processing power of the transaction device to satisfy the transaction fee. In some embodiment, the processor may be configured to determine a plurality of transaction fees associated with a plurality of currency accounts of the transaction device and may display the plurality of transaction fees and to accept input a transaction fee selection.

According to another aspect, a smart card for use in currency transactions may include an interface configured to exchange currency transactions with a host device and a memory device having a plurality of distributed ledgers stored thereon, each of the distributed ledgers associated with a different currency account of the transaction device and comprising a blockchain for each different currency account. The smart card may include a plurality of Field Programmable Gate Arrays (FPGA), each configured to support different currency network protocols and a selection mechanism configured to accept a selected currency account from a user of the transaction device. The smart card may include a processor including reprogramming logic for selectively reprogramming at least one of the plurality of FPGAs to optimally support a currency type of the selected currency account and a transaction fee processing unit for determining a transaction fee associated with the selected currency account, wherein the transaction fee processing unit uses processing capabilities of the transaction device to satisfy the transaction fee.

DEFINITIONS

As used herein, unless specifically indicated otherwise, the word "or" is used in the inclusive sense of "and/or" and not the exclusive sense of "either/or." Any issued U.S. Patents, allowed applications, published foreign applications, and references that are cited herein are hereby incorporated by reference to the same extent as if each was specifically and individually indicated to be incorporated by reference.

In order for the present invention to be more readily understood, certain terms are first defined below. Additional definitions for the following terms and other terms are set forth throughout the specification.

Connector means an interface of a service provider which controls the exchange of data between the service provider and a transaction device, where the interface may be a hardwired or wireless.

Consensus Protocol means a group of rules controlling the management of a shared, distributed ledger associated with a currency, including one or more tasks for validating transactions. Consensus Protocols may include a combination of one or more of proof-of-work, proof-of-stake, proof-of-burn, proof-of-activity and combinations and variants thereof.

Currency Network means a group of one or more accounts that have an ownership interest in a currency managed by a dedicated distributed ledger. Currency networks which may benefit from the utilization of the embodiments disclosed herein include, but are not limited to, cryptocurrency networks such as Bitcoin, Ethereum, Peer-Coin, LiteCoin and the many variants thereof, as well as currency networks such as that described in U.S. patent application Ser. No. 16/230,106, entitled "A SYSTEM AND METHOD FOR AUTHORIZING TRANSACTIONS IN AN AUTHORIZED MEMBER NETWORK", filed on even date herewith and incorporated herein by reference (hereinafter the "1988.0061 application").

"Optimizing" a transaction device for a currency protocol means configuring a Field Programmable Gate Array (FPGA) in accordance with the currency protocol, including but not limited to configuring the FPGA to improve the performance of at least one operation of the currency protocol. Improving the performance includes at least one of decreasing an overall processing time and/or resource utilization for the at least one operation through a combination of one or more of parallel operation processing, operation reordering and operation combining. Proof-of-Work means a piece of data which is difficult (costly, time-consuming) to produce but easy for others to verify, and which satisfies certain pre-identified requirements in accordance with a consensus protocol of the currency network. Examples of proof-of-work processes include Hashcash, hashcash-SHA1, hashcash-SHA256^2, hashcash-Scrypt(iter=1), Blake-256, CryptoNight, HEFTY1, Quark, SHA-3, scrypt-jane, and combinations thereof.

Task means one or more actions, functions, processes, manipulations or other operations. Multiple tasks may be performed to support the rules of a consensus protocol.

Transaction Device means a personal portable device comprising at least a memory sufficient to store at least one blockchain associated with at least one currency account and a Field Programmable Gate Array (FPGA) which may be customized to optimally support at least one aspect of a consensus protocol.

DETAILED DESCRIPTION

Over fifteen hundred cryptocurrencies are currently available as mediums of exchange, including Bitcoin, Ethereum, Ripple, Bitcoin Cash, Litecoin and EOS, and more may be generated at any time. Although cryptocurrency networks each manage their individual ledgers using blockchains, the architecture of the blocks and consensus protocols used by different cryptocurrency networks to validate the blockchains varies. As cryptocurrency use becomes more prevalent, the number and variety of cryptocurrency accounts owned by a consumer has increased. According to one aspect of the invention, a system and method of the present invention increases the ease of access and use of different currency networks by consumers using customizable transaction devices. The customizable transaction devices may be re-programmed prior to or during a currency transaction to optimally support the consensus protocol of the currency transaction, for example by configuring the FPGA to improve the performance of at least one operation of the currency protocol. Improving the performance includes decreasing an overall processing time or resource utilization for the at least one operation through parallel processing, operation reordering, operation combination, etc. The currency network further includes one or more host devices, each of which include an interface configured to communicate with a transaction device for the purposes of re-programming a Field Programmable Gate Array (FPGA) of the transaction device to optimally support one or more currency network consensus protocols. Optimizing the performance of transaction devices for proof-of-work or other consensus protocol processing decreases the latency associated with validating currency network transactions, thereby increasing the suitability of cryptocurrency for retail transactions.

These and other features of the invention will now be described with reference to the figures, wherein like reference numerals are used to refer to like elements throughout.

As used in this application, the terms "system" and "component" are intended to refer to a computer-related entity, either hardware, a combination of hardware and software, software, or software in execution, examples of which are described herein. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

Figure 1:
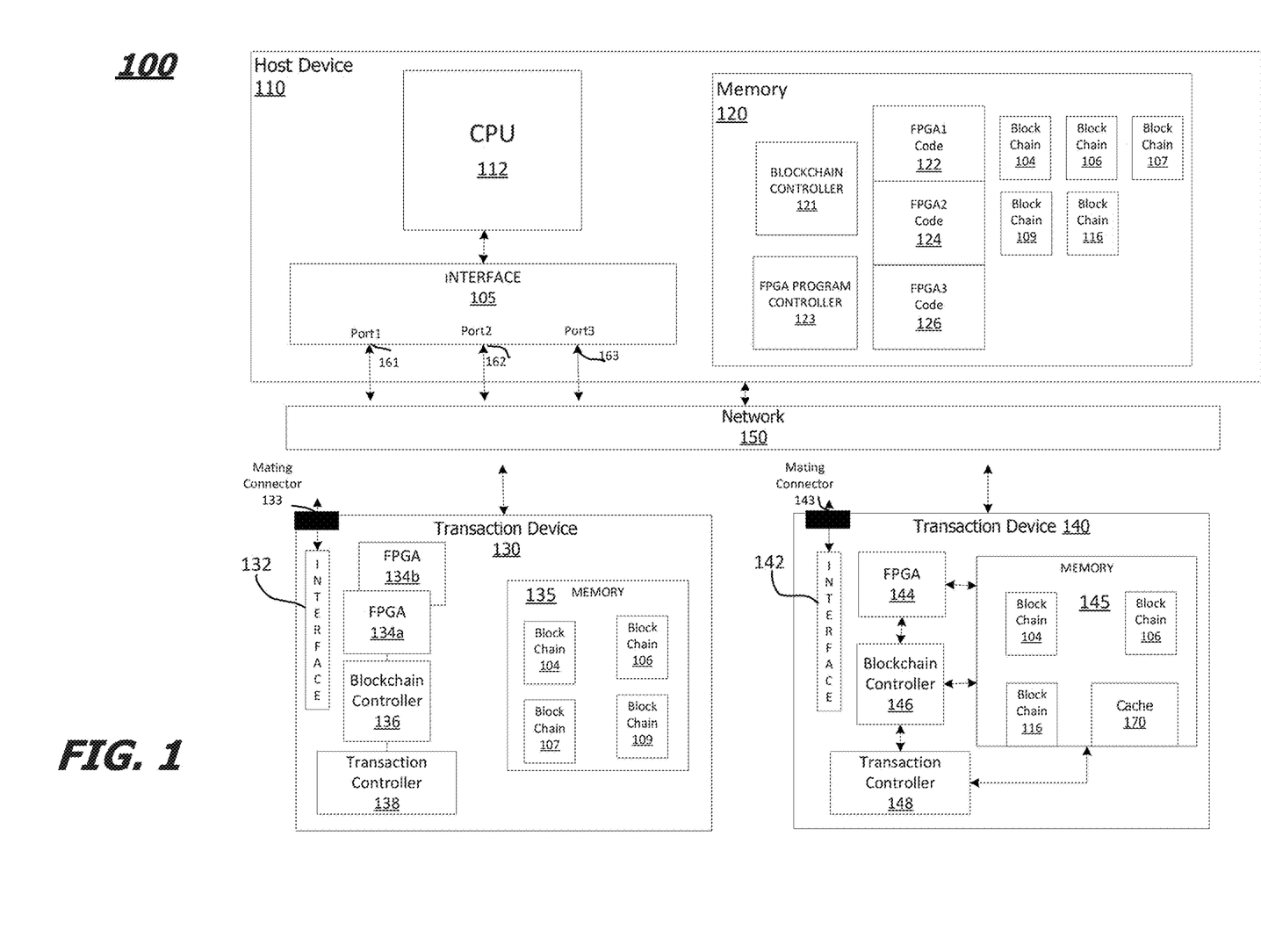
FIG. 1 is a block diagram illustrating exemplary devices and components thereof that may be included in a currency network operating according to aspects of the present invention.

FIG. 1 is a block diagram illustrating exemplary components that may be found in a currency network 100 supporting the invention. The currency network 100 includes a host device 110 coupled to transaction device 130 and transaction device 140 via a network 150.

The network 150 may be any one or the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks. The network may also include a short-range wireless communication interface, such as near field communication (NFC), radio-frequency identification, and Bluetooth networks.

One or more host devices such as host device 110 may be included in network 100. Host device 110 includes a memory 120, a Central Processing Unit (CPU) 112 and an Interface 105. According to one aspect of the invention, memory 120 of host device 110 stores program code that is operable when executed upon by the CPU 112 to perform one or more pre-defined tasks. For example, memory 120 is shown to include program code for blockchain controller 121 and FPGA program controller 123. In one embodiment, blockchain controller 121 controls the management of blockchains for each currency network of which the host is a member in accordance with consensus protocols. As will be described in more detail below, FPGA program controller 123 controls the programming of transaction devices, such as transaction device 130 and transaction device 140.

Host device 110 also includes an interface 105. Interface is shown to include multiple ports, or connectors, such as Port1 162, Port2 163 and Port3 163. Each port supports a communication medium. For example, Port1 161 may be a multi-pinned connector configured to engage with a mating connector 133 of a transaction device to facilitate download of program code to a FPGA 134 of transaction device 130. Port2 162 may be an Ethernet port, enabling connection of the host device 110 to an ethernet network. Port3 163 may be a WIFI interface for example. Although three ports are shown, it is appreciated that a host device 110 may advantageously include multiple connector ports dedicated to FPGA programming to enable a host device 110 to simultaneously reprogram multiple transaction devices. In addition, although programming is described as performed using dedicated pinned connectors, it is envisioned that other communication mediums may be used to exchange re-programming information (e.g., data and/or instructions) between a host and a transaction device, and the present invention is not limited to data protocol for transferring re-programming data between the host and the transaction device.

Transaction devices 130, 140 are, in one aspect, personal portable devices comprising an interface 132/142, a memory 135/145, a blockchain controller 136/146, and a transaction controller 138/148. As will be described in more detail below, each transaction device may include one or more Field Programmable Gate Arrays (FPGAs). According to one aspect, each FPGA is configured to support one or more tasks of a currency protocol. In one embodiment, transaction devices may take a variety of forms and may manage accounts for a variety of different currencies. Accordingly, transaction devices may include different numbers of FPGAs; for example, transaction device 130 is shown to include FPGAs 134a and 134b, while transaction device 140 is shown to include a single FPGA 144. Such transaction devices may configure each FPGA 134a, 134b according to different currency protocols, enabling the transaction device to optimally process multiple types of currency transactions. In embodiments of transaction devices that do not include multiple FPGAs, such as transaction device 140, transaction devices may advantageously comprise a cache 170 that may be used to store FPGA programming code associated with a currency protocol, although it is not required.

In some embodiments, the transaction device 130 may be embodied in a smart card, a smart phone, a handheld personal computer (PC), a tablet PC, a Personal Digital Assistant (PDA), a cellular telephone or the like. It is appreciated that a variety of personal, portable computing devices are commercially available, and that any of those devices that are capable of being programmed in accordance with currency network consensus protocols are within the scope of the invention.

In the illustrated embodiment, interface 132/142 of the respective transaction devices 130, 140 are shown to include connectors 133/143 which are configured for coupling with the host device 110 for downloading FPGA programming code to FPGAs (134a, 134b, 144) and/or caches (170) as will be described in more detail below. The interfaces may also include functionality for enabling both wireless and wireline communication with other members of a currency network. The interfaces may also include user interfaces, enabling a user of the transaction device to initiate a transaction over the currency network. The user interface may include some combination of a keypad, buttons, touchpad, audio receiver, and other types of interfaces capable of capturing user intent.

Blockchain controllers 136/146 include a combination of hardware and software that cooperate to support distributed ledger management according to currency network protocols. Transaction controllers 138/148 generate new transactions for the transaction devices 130 and 140. In some embodiments, the transaction controllers operate in response to input received at the interface, and work cooperatively with the blockchain controllers to generate blockchain transactions.

As shown in FIG. 1, the transaction devices 130, 140 may have access to multiple currency accounts, each of the currency accounts associated with similar or different currency networks and managed by a blockchain. Each blockchain is associated with a currency account, and stores information associated with the account, including information related to an account value, including a list of transactions for the account. Thus, transaction device 130 is associated with at least four different currency accounts managed by four different blockchains 104, 106, 107 and 109. Transaction device 140 is associated with at least three different currency accounts, managed by three different blockchains 104, 106 and 116. The currency accounts may be cryptocurrency accounts, such as Bitcoin, Ethereum, Peercoin, etc.

Alternatively, the currency account may be a fiat currency account managed by or via blockchain technology as described in the 1988.061 Application. The 1988.0061 application describes a system wherein members of an authorized network manage account information using blockchain ledgers. An authorized network is a network of members which have been admitted to the network by a central authority. For example, a central authority may be a credit card issuer, bank, or other entity that manages typical fiat currency payment accounts for a consumer. Members of the authorized network include both consumers and merchants. Because both the consumer and the merchant maintain copies of the blockchain, for any consumer/merchant transaction, both entities can quickly validate the transaction because both are aware, via their blockchain entries, of the current status of the account sourcing the transaction. With such an arrangement, fast and accurate transaction validation can be provided without incurring the processing charges inherent in traditional fiat currency credit transactions.

In one embodiment of the 1988.0061 Application, the components that are used to support member blockchain transactions are provided in a transaction device having substantially a look and feel of a traditional credit card and including both memory and processing capability. In alternate embodiments, the components that are used to support member blockchain transactions are implemented using dedicated software operating on a smart device of the consumer. Either embodiment may comprise a "transaction device" that may benefit from the principles disclosed herein.

In the embodiment of FIG. 1, host device 110 is shown to be a member of all currency networks that may be used by transaction devices 130 and 140, and thus stores blockchains 104, 106, 107, 109 and 116. In other embodiments, the host device 110 may be a member of only a subset of currency networks available to transaction devices 130, 140. In still other embodiments the host device may be a member of a currency network that is unavailable to the transaction devices. For example, when the host device 110 is a merchant device, such as a Point-of-Sale device at a retail store, as described in the 1988.0061 application, the merchant bank may be a member of a separate currency network which receives merchant funds.

In one embodiment, host device 110 stores programming code 122, 124 and 126 for a plurality of different FPGA configurations, each programming code for programming digital circuitry to perform logical functions tailored to specific consensus protocols. For example, for consensus protocols that use a particular hash function, the arrangement of inputs and outputs of circuitry within an FPGA may be mapped to maximize parallel processing capabilities of the FPGA.

Figure 2:
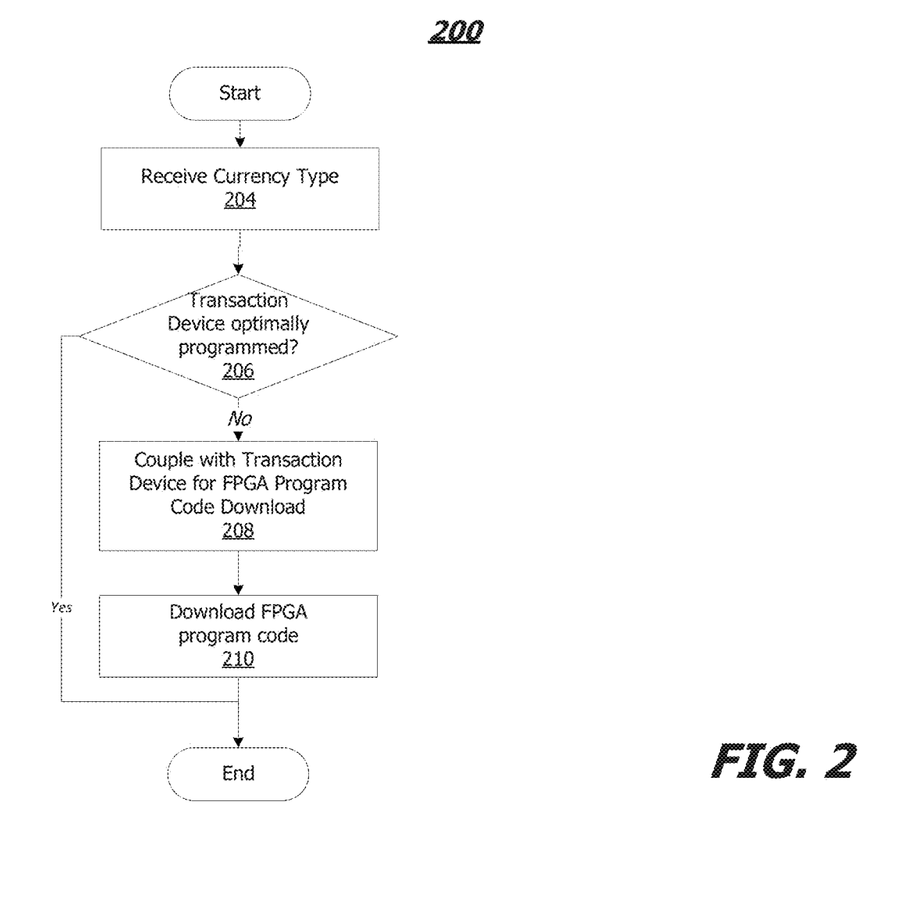
FIG. 2 is a flow diagram illustrating exemplary steps that may be performed by a host device in the currency network of FIG. 1 to program a transaction device.

FIG. 2 is a flow diagram illustrating exemplary steps 200 that may be performed in one embodiment by a host device 110 to optimize a transaction device's performance within a currency network by customizing the configuration of an FPGA in accordance with the currency protocol. At step 204, the host device receives a currency type from a transaction device. The currency type may identify one or more of a currency, a currency consensus protocol type, or a currency consensus task. As will be described in more detail in FIG. 3, the currency type may be provided as part of a currency transaction. Alternatively, the transaction device may communicate prior to any transaction to prepare the FPGA in advance. In one embodiment, communication may involve a request for programming according to a currency type identified by the transaction device. In other embodiments, the communication may include a suggestion of a currency type from the host based on characteristics of available currency networks, such as processing time and transaction fees.

Once the host determines the currency type at step 204, at step 206 the host determines whether the transaction device has one or more FPGAs that have been configured to support the currency type. This determination may be made by querying the transaction device for FPGA type(s), or, in embodiments where this determination is made as part of a transaction request, by examining FPGA type(s) included as part of the transaction. In some embodiments, the FPGA types include the currency type for which an FPGA is programmed and may also include an identifier of any FPGA code that may be stored in a cache or other storage medium of the transaction device. If it is determined at step 206 that the FPGA of the transaction device is programmed for the currency protocol, then at step 208 the host device couples with the transaction device. During re-programming, program code associated with the selected currency type is forwarded over a communication link from the host to the transaction device. The communication link may be a hardwired multi-pin connector link which is configured for fast download of program code. Alternatively, other communication links, such as WIFI or other short range wireless links may be used.

In some embodiments, the transaction device may include a user interface controlled by a client-side software application that operates at the direction of the host device. At step 208, the user interface may drive re-programming by providing a visual or audible prompt to encourage the user of the transaction device to couple with the host device for re-programming of the FPGA. Alternatively, for transaction/host device pairs that support wireless data transfer, FPGA programming may be performed automatically without intervention of the user of the transaction device.

Figure 3:
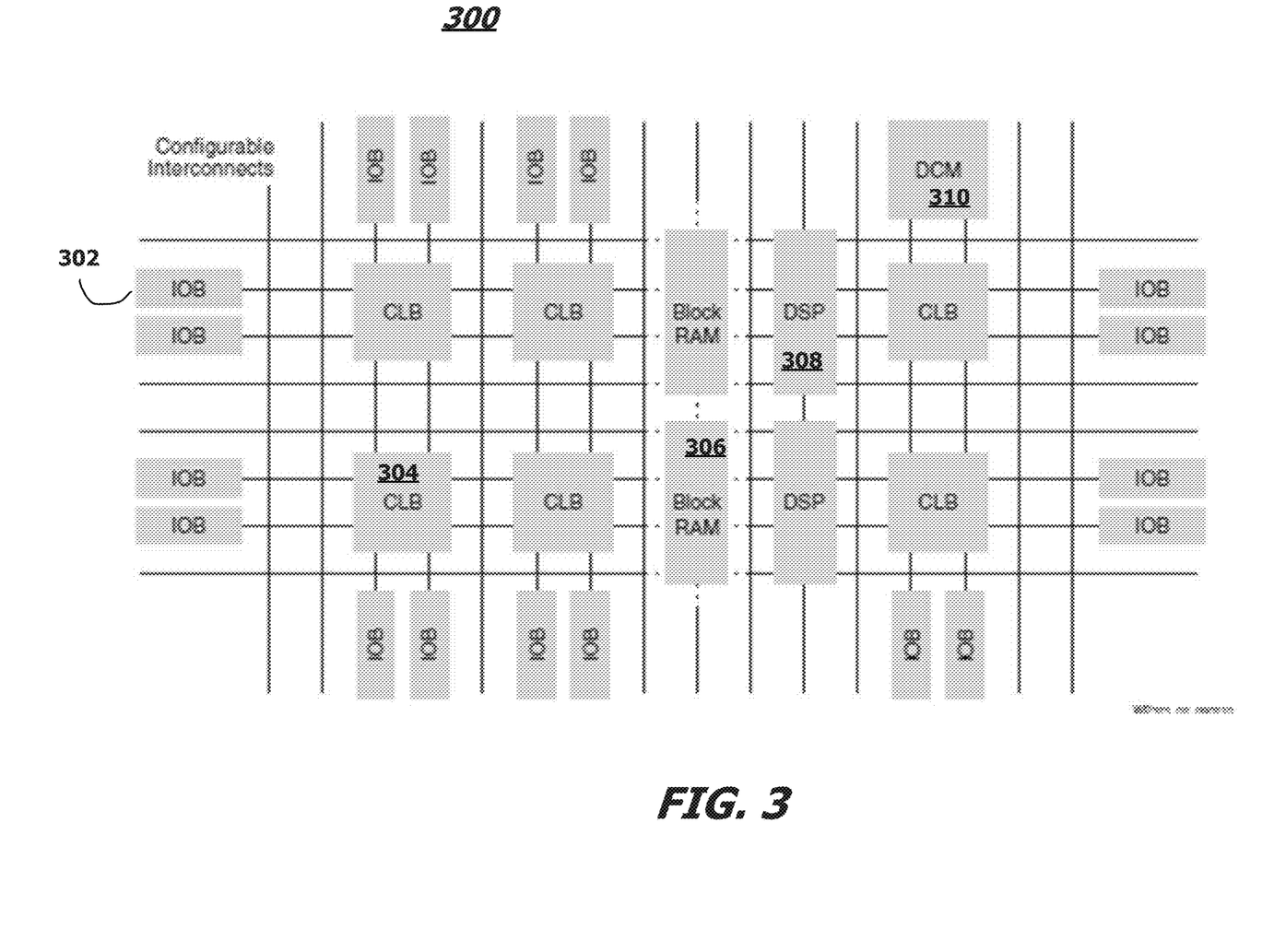
FIG. 3 is a circuit diagram of a Field Programmable Gate Array (FPGA) which may be included in a transaction device of FIG. 1.

Once the transaction device is communicatively coupled to the host device, at step 210 FPGA program code is either stored in a cache or used for re-programming an FPGA of the transaction device. Referring briefly to FIG. 3, a block diagram of an exemplary FPGA 300 that may be included within a transaction device of the present invention is shown. The FPGA may be manufactured by companies such as Xilinx®, Altera®, Intel® and similar companies. In general, FPGAs are composed of a large array of configurable logic blocks (CLBs) 304, digital signal processing blocks (DSPs) 308, block RAM 306, a Digital Clock Manager (DCM) 310 and input/output blocks (IOBs) 302. CLBs and DSPs, similar to a processor's arithmetic logic unit (ALU), can be programmed to perform arithmetic and logic operations like add, multiply, subtract, compare, etc. Unlike a processor, in which architecture of the ALU is fixed and designed in a general-purpose manner to execute various operations, the CLBs can be programmed with just the operations needed by the application for task specific efficiency. FPGAs excel at any task that can be done in a parallel process, such as a mining hash to create an output resulting in a successful hash, and thus a 'winning' block.

The wiring that interconnects components of the FPGA is programable, with the programming data for the FPGA held by block RAM 306 and others distributed around the chip, so every JOB, CLB and DSP is driven by an SRAM bit loaded by the program bit stream. As part of step 210, when the host programs the FPGA of the transaction device, it retrieves FPGA program code associated with the selected currency type from a plurality of different FPGA programming codes stored in host memory and forwards this programming code over the communication medium to the transaction device. According to one aspect, a host stores program code for customizing transaction device FPGAs in accordance with one or more consensus protocols.

Once programming is completed, the host device may indicate to the transaction device that the device is ready for use. In some embodiments, a status indicator may be provided on the transaction device, the status indicator providing a combination of one or more of a visual, audible or haptic feedback to the user regarding the reprogramming state of the transaction device. For example, the transaction device may comprise a Light Emitting Diode (LED) configured to glow red while the transaction device is reprogramming. Haptic feedback in the form of a vibration may signal the user that the reprogramming is complete. In one embodiment, the status indicator is managed in response to signaling from the host device, for example in a response to a 'completion of download' signal from the host device. Other embodiments wherein the status indicator is further managed in response to input from the transaction device, for example during initial programming of the FPGA, or alternatively in response to message exchanges between the transaction device and the host device may also be used.

In one embodiment, this may be performed using a light or other visual indicator provided on the host, proximate to the transaction device connection. In other embodiments, the host may use another communication to contact a user associated with the transaction device, for example by initiating a call or text to a cell number associated with the transaction device. Other methods for indicating completion of programming, such as providing an audible tone, ejecting the transaction device, etc. may be substituted herein without affecting the scope of the invention.

As described above, in some transaction devices that support multiple currency accounts, FPGA program code may be stored in a cache of a transaction device, for example for a frequently used currency. A user interface of such transaction devices may operate in response to a selection of a currency type having optimizing program code stored in a cache to automatically re-program the FPGA using the stored program code, swapping the program code for the previous currency into the cache for later use. It can be appreciated by those of skill in the art that the number of different FPGA program codes stored in a cache of a transaction device and/or the number of FPGA included in a transaction device is limited only by the available resources of the device.

Figure 4:
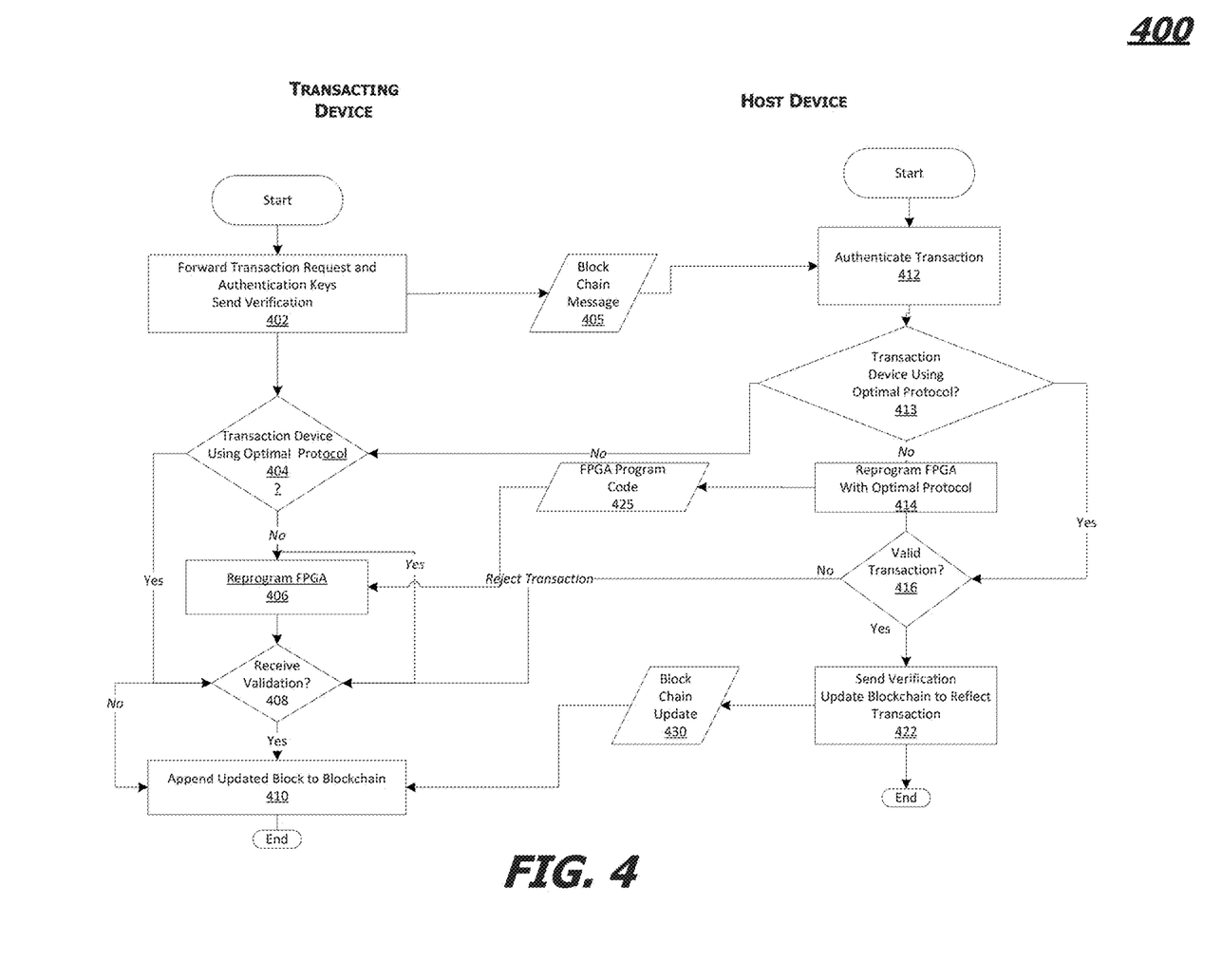
FIG. 4 is a flow diagram illustrating exemplary steps that may be performed by a host and a transaction device during a currency transaction.

FIG. 4 illustrates various actions 400 that may be performed by a transaction device and a host device when the transaction device issues a currency transaction. At step 402, the transaction device issues a transaction as a proposed block chain update 405 to host device. At step 404 the transaction device waits for potential re-programming. At step 412, the host device may authenticate a blockchain update message 405 encrypted using a private key of a source transaction device, by decrypting it using the public key of the source transaction device. The blockchain update message may include, for example, an identifier of an account in a particular currency network, information related to a value of the account, and a transaction request. At step 413, as described in FIG. 2, the host device determines whether the transaction device configured in accordance with the currency type. If it is not, then at step 414 the FPGA is re-programmed as described with regard to FIG. 3. FPGA program code 425 is forwarded to the transaction device. The program code may be associated with an instruction for reprogramming the transaction device, and at step 406 transaction device applies the program code to the FPGA responsive to receipt of the program code and/or the instruction. In a process such as that of FIG. 4, where a currency transaction was forwarded as blockchain update 405, the transaction device awaits validation of the blockchain update 405 at step 408.

At step 416, the host device continues processing the currency transaction as a member of the currency network, by authenticating the transaction and validating the blockchain according to the currency network consensus protocol. If it is determined at step 416 that the transaction is valid, then at step 422 the host updates the blockchain and forwards the validated blockchain update 430 to the currency network. The transaction device, as part of the currency network, receives the blockchain update validation and at step 410 appends the updated block to the blockchain.

If at step 416 the transaction is determined not to be valid by the host, for example, if the host determines that input currency source have been previously spent or that the transaction device is not authenticated, then the host device rejects the transaction, forwarding the rejection back to the transaction device, which discards the previously generated blockchain update.

Figure 5:
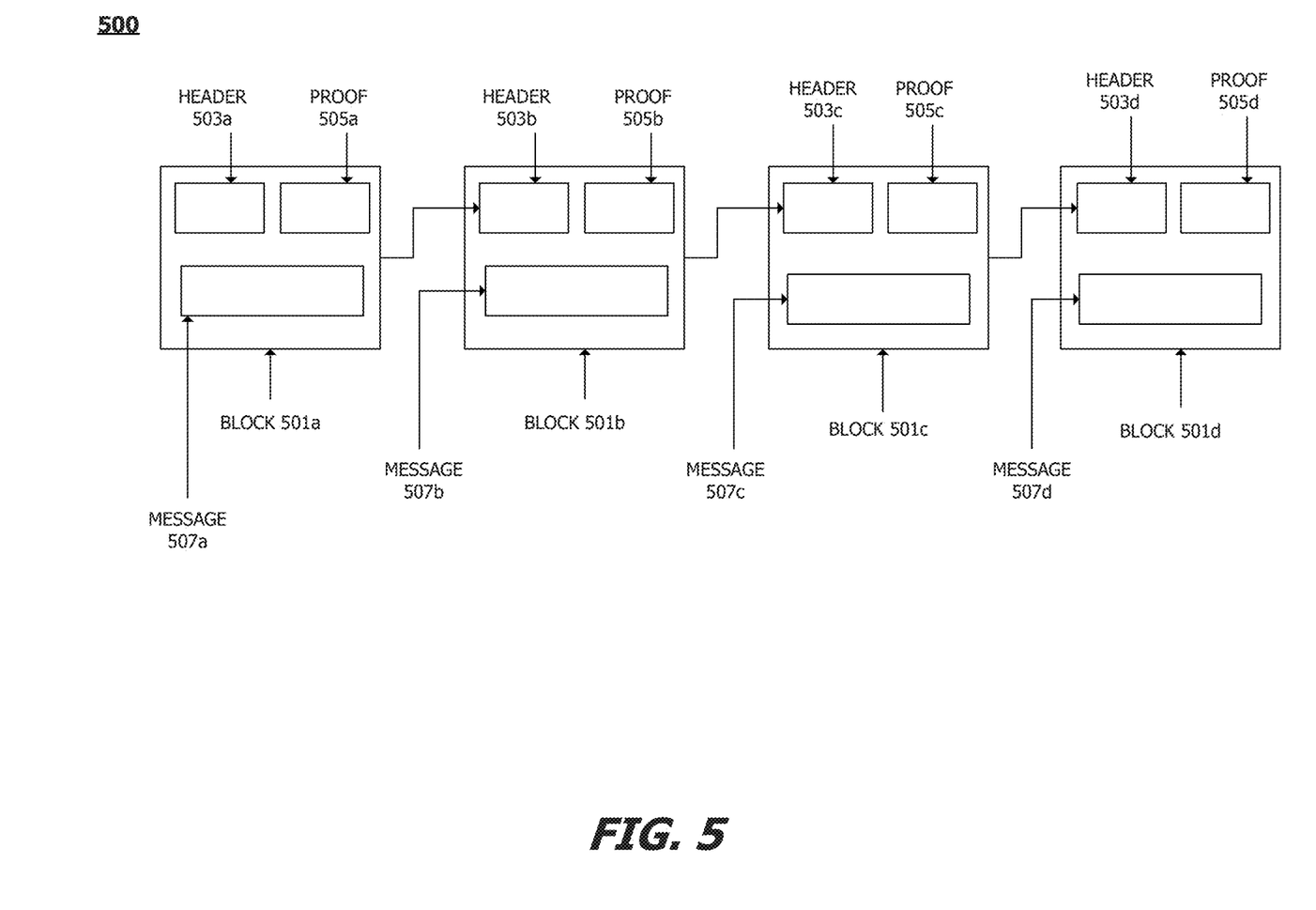
FIG. 5 is a diagram illustrating various components of a blockchain that may be used to manage currency ledgers in the network of FIG. 1.
Figure 6:
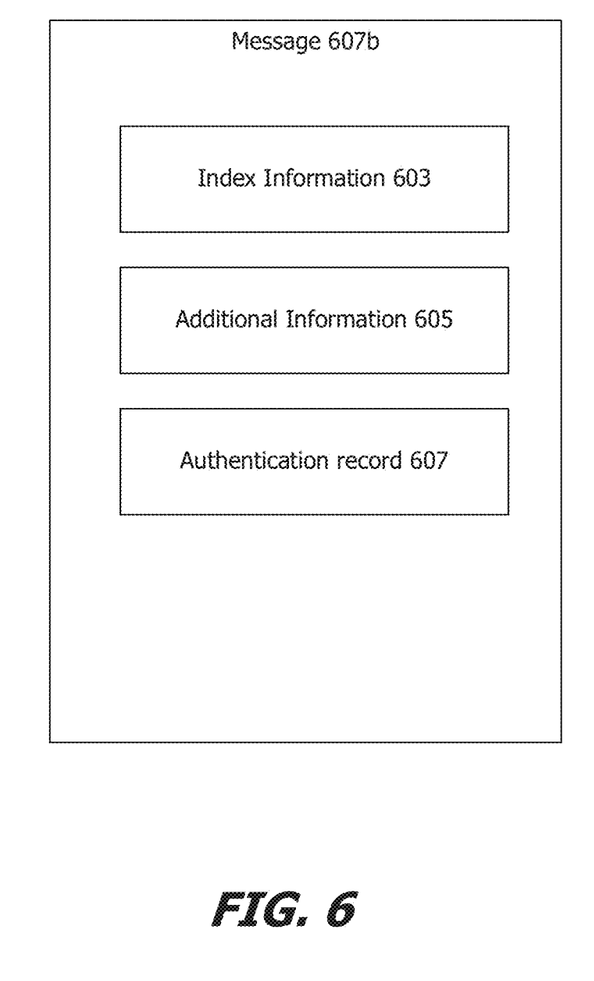
FIG. 6 is a block diagram illustrating exemplary fields of a block message that may be included in a block of the blockchain of FIG. 5.

FIGS. 5 and 6 illustrate various aspects of a blockchain block which may be used in currency networks that benefit from principles of the present invention. FIG. 5 depicts a logical model of an exemplary blockchain 500, consistent with disclosed embodiments. Such exemplary blockchains may comprise blocks, such as blocks 501*a*-501*d*. Blocks may include messages, such as messages 507*a*-507*d* and a header, such as headers 503*a*-503*d*, which uniquely identifies each block. The headers 503*a*-503*d* may include a hash value generated by a hash function. A hash function is any function that can be used to map input data of arbitrary size to a hash value of a fixed size. For example, a header may include at least one of the previous block's hash value, a hash value generated based on any messages in the block (e.g., a Merkle root), and a timestamp. Consistent with disclosed embodiments, currency network 100 may require that blocks added to blockchain 500 satisfy at least one of a proof-of-work condition (e.g., a proof 505*a*-505*d*) and a digital signature condition. For example, the headers 503*a*-503*d* may include a nonce chosen to ensure the header satisfies the proof-of-work condition. As a non-limiting example, the proof-of-work condition may require the hash of the header fall within a predetermined range of values. As an additional example, the header may be digitally signed with a cryptographic key of an authorized system, and the digital signature may be included in the header. This digital signature may be verified using a key available to the members of currency network 100. Generally, one or more designated nodes of an authorized member network (e.g., the member device or host device) may generate blocks 501a-501d including headers 502, proofs 505a-505d, and messages 507a-507d to initiate a payment transaction over the authorized network.

As mentioned above, according to one aspect, the currency type of a transaction is associated with certain tasks of a consensus protocol. In some embodiments, the currency type is associated with the hash function, and an FPGA programmed as described herein is configured to perform the cryptography and hashing described above.

FIG. 6 depicts a logical model of a message 607b stored in a blockchain (e.g., an element of blockchain 500), consistent with disclosed embodiments. As described with regard to FIG. 1, blockchain controller components of the transaction device or the host device may generate a blockchain messages such as the message 607b. In some embodiments, message 607b may comprise index information 603. In certain aspects, index information 603 may comprise information identifying a specific currency account. In various aspects, index information 503 may include one or more references to earlier blocks in the blockchain 500. For example, index information 603 may include one or more references to one or more earlier blocks associated with the same currency account. A reference may include, as a non-limiting example, a hash of a preceding block in the blockchain associated with the same user. In some embodiments, index information 603 may be obfuscated or encrypted according to methods known to one of skill in the art. For example, index information 603 may be encrypted with a cryptographic key. As an additional example, index information 603 may comprise a hash of the at least one of a full name, email address, phone number, or other non-sensitive personal information of the user.

Message 607b may comprise additional information 605, consistent with disclosed embodiments. The additional information 605 may include, for example, a list of inputs supporting the transaction, a currency type, an FPGA type of the transaction device and other transaction related information. In various aspects, additional information 605 may be obfuscated or encrypted according to methods known to one of skill in the art. For example, root system information 605 may be encrypted with a cryptographic key.

Message 607b may comprise authentication record 607, consistent with disclosed embodiments. In some aspects, authentication record 607 may comprise information enabling subsequent auditing of transactions. For example, authentication record 607 may identify at least one of a transaction originating device and a transaction destination device. In some aspects, authentication record 607 may be obfuscated or encrypted according to methods known to one of skill in the art. For example, authentication record 607 may be encrypted with a cryptographic key.

The blockchain elements of FIGS. 5 and 6 are common to both cryptocurrencies and blockchain fiat currency solutions as described in the 1988.061 application. It should be noted that although the processes of FIGS. 2 and 4 have described an interaction between a single host and a single transaction device, it is envisioned that in some embodiments a host may include the capabilities to simultaneously manage transactions and perform re-programming in parallel for multiple different transaction devices. The transaction devices may be programmed either prior to, or during a transaction.

Figure 7:
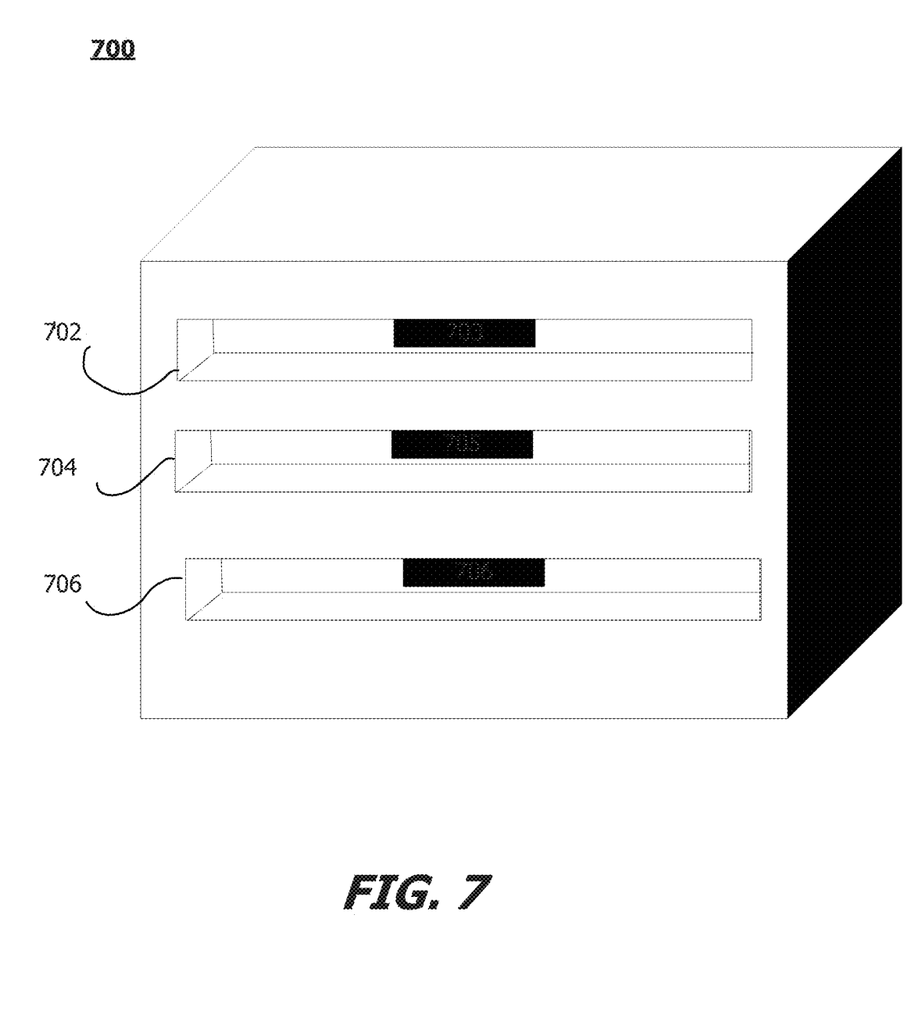
FIG. 7 illustrates one embodiment of a host device interface which may be provided by a host of the currency network of FIG. 1.

For example, referring now to FIG. 7, a host device 700 includes the functionality described regarding host device 110 of FIG. 1, but includes a plurality of programming slots 702, 704 and 706, each slot including a respective connector 703, 705 and 706. In some embodiments, a host may provide the programming device 700 at their retail establishment. A user having a transaction device may use the interface to select a transaction currency and insert the transaction device into one of the slots 702 to engage connector 703. The host may then execute the process of FIG. 2 to selectively re-program the device while the consumer shops in the establishment.

In some embodiment, the host device 700 may also support currency transactions as follows. As mentioned above, one aspect of a cryptocurrency protocols may include the processing of a proof-of-work or performance of other task or messaging exchange for transaction authentication. The processing requirements may be onerous. Cryptocurrency networks are able to drastically reduce processing times by distributing processing loads among hundreds or thousands of members of the cryptocurrency network. In one aspect, the host device 700 may be additionally be configured to support cryptocurrency network processing, for example by using processing capabilities of user devices that are coupled to the host device to support currency transaction processing.

Should the owner of a transaction device desire to initiate a transaction, the owner may provide transaction information to the transaction device, which then forwards the transaction to the host as described with regard to FIG. 4. In this example, when the transaction device is inserted into the host device 700, the host determines whether the transaction device requires re-programming, and following any re-programming, the host device processes the transaction. In some embodiments, a consensus protocol may utilize processing capabilities of the transaction device to validate a blockchain update.

One exemplary use case of the host device includes a user seeking to perform a transaction using a selected currency network and inserting their transaction device into the host device 700. The host device 700 may selectively re-program the transaction device, and then initiate the transaction, for example by generating a blockchain entry an initiating a proof-of-work or other task dictated by the currency network consensus protocol. The host device may use processing power of the transaction device, as well as any other coupled transaction device, to perform the processing for validation under the consensus protocol. Once the transaction is validated, the user may extract the transaction device from the host device. A transaction device may be 'paid' a transaction fee in return for the processing time that was used if the transaction device's block is the one added to the chain. In other embodiments, a transaction device may be 'charged' a transaction fee to compensate for processing time for the block chain transaction.

Accordingly, a system and method for optimizing cryptocurrency network performance includes a host device that selectively controls the programming of transaction devices such that each transaction device is configured in accordance with a currency protocol of its respective currency network. Programming may be performed prior to or during transactions, and multiple transaction devices may interface simultaneously with a host device for one of transaction or re-programming. With such an arrangement, the performance of transaction devices and the efficiency of currency networks is enhanced.

With general reference to notations and nomenclature used herein, the detailed descriptions herein may be presented in terms of functional blocks or units that might be implemented as program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein, which form part of one or more embodiments. Rather, the operations are machine operations. Useful machines for performing operations of various embodiments include general purpose digital computers or similar devices.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but still co-operate or interact with each other.

Various embodiments also relate to apparatus or systems for performing these operations. This apparatus may be specially constructed for the required purpose or it may comprise a general-purpose computer as selectively activated or reconfigured by a computer program stored in the computer. The procedures presented herein are not inherently related to a particular computer or other apparatus. Various general-purpose machines may be used with programs written in accordance with the teachings herein, or it may prove convenient to construct more specialized apparatus to perform the required method steps. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, various features are grouped together in a single embodiment to streamline the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. A point-of-sale (POS) terminal comprising:
 a first port adapted to receive a first currency transaction associated with a first currency type from a first transaction device;
 a second port adapted to receive a second currency transaction of a second currency type from a second transaction device;
 a non-volatile memory device comprising a plurality of blockchains and reprogramming instructions, the plurality of blockchains associated with a plurality of currency networks, including currency networks of the first currency type and the second currency type, and wherein the second currency type uses a second protocol that is a different protocol than a first protocol for the first currency type, and wherein the reprogramming instructions for programming a plurality of Field Programmable Gate Arrays (FPGAs) of transaction devices, including a first portion of reprogramming instructions to reprogram the first transaction device to configure the first transaction device according to the first protocol, and of a second portion of reprogramming instructions to reprogram a second transaction device to configure the second transaction device according to the second protocol;
 a processor, operable when executing instructions, to:
  send, in response to the first currency transaction, the first portion of the reprogramming instructions to the first transaction device to selectively reprogram an FPGA of the first transaction device in accordance with the first protocol of the first currency transaction, wherein the first currency transaction includes a currency type and an FPGA protocol indicator, and wherein the reprogramming instructions to selectively reprogram the first transaction device in accordance with the first protocol is responsive to a difference between the FPGA protocol indicator and the first protocol; and
  send, in response to the second currency transaction, the second portion of the reprogramming instructions to the second transaction device to selectively reprogram an FPGA of the second transaction device in accordance with the second protocol of the second currency transaction, wherein the second currency transaction includes a second currency type and a second FPGA protocol indicator, and wherein the second portion of the reprogramming instructions to selectively reprogram the second transaction device in accordance with the second protocol is responsive to a difference between the second FPGA protocol indicator and the second protocol.

2. The POS terminal of claim 1 wherein the processor is further operable when executing the reprogramming instructions to determine a transaction fee for the first currency transaction.

3. The POS terminal of claim 2 wherein the transaction fee is determined according to the protocol of the first currency type.

4. The POS terminal of claim 3 wherein the transaction fee is determined in terms of the first transaction device's processing time.

5. The POS terminal of claim 3 including means for using processing power of the first transaction device to satisfy the transaction fee.

6. The POS terminal of claim 1, wherein the processor is further operable when executing the reprogramming instructions to select an alternate currency type for use by the first transaction device or the second transaction device based on one or more of a processing time and a transaction fee associated with the first currency transaction and the second currency transaction.

7. The POS terminal of claim 1, wherein the first currency type is different from the second currency type.

8. The POS terminal of claim 1 further comprising a third port adapted to receive a third currency transaction of a third currency type from a third transaction device; and
the processor, in response to the third currency transaction, to send a third portion of the reprogramming instructions to selectively reprogram an FPGA of the third transaction device in accordance with a third protocol in parallel with reprogramming the FPGA of the first transaction device in accordance with the first protocol or the FPGA of the second transaction device in accordance with the second protocol.

9. The POS terminal of claim 1 wherein the first protocol and the second protocol comprise consensus protocols of different block chain currency networks.

10. A computer-implemented method, comprising:
receiving, by a first port of a point-of-sale (POS) terminal, a first currency transaction associated with a first currency type from a first transaction device;
receiving, by a second port of the POS terminal, a second currency transaction of a second currency type from a second transaction device;
sending, by the POS terminal and response to the first currency transaction, a first portion of reprogramming instructions to a first transaction device to selectively reprogram an FPGA of the first transaction device in accordance with a first protocol of the first currency transaction, wherein the first currency transaction includes a currency type and an FPGA protocol indicator, and wherein the reprogramming instructions to selectively reprogram the first transaction device in accordance with the first protocol is responsive to a difference between the FPGA protocol indicator and the first protocol; and
sending, by the POS terminal and response to the second currency transaction, a second portion of the reprogramming instructions to the second transaction device to selectively reprogram an FPGA of the second transaction device in accordance with a second protocol of the second currency transaction, wherein the second currency transaction includes a second currency type and a second FPGA protocol indicator, and wherein the second portion of the reprogramming instructions to selectively reprogram the second transaction device in accordance with the second protocol is responsive to a difference between the second FPGA protocol indicator and the second protocol.

11. The computer-implemented method of claim 10, comprising executing the reprogramming instructions to determine a transaction fee for the first currency transaction.

12. The computer-implemented method of claim 11, wherein the transaction fee is determined according to the protocol of the first currency type.

13. The computer-implemented method of claim 12, wherein the transaction fee is determined in terms of the first transaction device's processing time.

14. The computer-implemented method of claim 12, comprising utilizing processing power of the first transaction device to satisfy the transaction fee.

15. The computer-implemented method of claim 10, comprising executing the reprogramming instructions to select an alternate currency type for use by the first transaction device or the second transaction device based on one or more of a processing time and a transaction fee associated with the first currency transaction and the second currency transaction.

16. The computer-implemented method of claim 10, wherein the first currency type is different from the second currency type.

17. The computer-implemented method of claim 10, comprising:
receiving, via a third port of the POS terminal, a third currency transaction of a third currency type from a third transaction device; and
sending, by the POS terminal, third portion of the reprogramming instructions to selectively reprogram an FPGA of the third transaction device in accordance with a third protocol in parallel with reprogramming the FPGA of the first transaction device in accordance with the first protocol or the FPGA of the second transaction device in accordance with the second protocol.

18. The computer-implemented method of claim 10, wherein the first protocol and the second protocol comprise consensus protocols of different block chain currency networks.

19. The POS terminal of claim 1, wherein the first transaction device comprises a first credit card and the second transaction device comprises a second credit card.

20. The POS terminal of claim 10, wherein the first transaction device comprises a first credit card and the second transaction device comprises a second credit card.

* * * * *